United States Patent
Brodeur et al.

(10) Patent No.: US 8,015,995 B2
(45) Date of Patent: Sep. 13, 2011

(54) SYSTEM AND METHOD FOR FLOW MONITORING AND CONTROL

(75) Inventors: Craig L. Brodeur, Marlborough, MA (US); Marc Laverdiere, Wakefield, MA (US); Robert F. McLoughlin, Pelham, NH (US); J. Karl Niermeyer, Tyngsboro, MA (US); Jieh-Hwa Shyu, Andover, MA (US)

(73) Assignee: Entegris, Inc., Billerica, MA (US)

( * ) Notice: Subject to any disclaimer, the term of this patent is extended or adjusted under 35 U.S.C. 154(b) by 0 days.

(21) Appl. No.: 12/777,019

(22) Filed: May 10, 2010

(65) Prior Publication Data
US 2010/0236643 A1 Sep. 23, 2010

Related U.S. Application Data

(63) Continuation of application No. 11/054,467, filed on Feb. 9, 2005, now Pat. No. 7,740,024, which is a continuation-in-part of application No. 10/777,300, filed on Feb. 12, 2004, now Pat. No. 6,973,375.

(51) Int. Cl.
*G05D 7/06* (2006.01)

(52) U.S. Cl. ............. 137/487.5; 137/557; 700/282; 702/100

(58) Field of Classification Search ........... 137/487.5, 137/554, 557, 486; 700/282; 702/100
See application file for complete search history.

(56) References Cited

U.S. PATENT DOCUMENTS

| | | | |
|---|---|---|---|
| 5,251,148 A * | 10/1993 | Haines et al. | 137/487.5 |
| 5,277,215 A | 1/1994 | Yanagawa et al. | |
| 5,684,245 A | 11/1997 | Hinkle | |
| 5,687,759 A * | 11/1997 | Tan | 137/487.5 |
| 5,868,201 A | 2/1999 | Bussear | |
| 5,944,048 A | 8/1999 | Bump et al. | |
| 6,026,849 A | 2/2000 | Thordarson | |
| 6,119,710 A | 9/2000 | Brown | |
| 6,152,162 A | 11/2000 | Balazy | |
| 6,167,965 B1 | 1/2001 | Bearden | |
| 6,176,247 B1 | 1/2001 | Winchcomb | |
| 6,314,992 B1 | 11/2001 | Ohmi et al. | |
| 6,314,997 B1 | 11/2001 | Yamashita | |
| 6,441,744 B1 | 8/2002 | Adams | |
| 6,467,505 B1 | 10/2002 | Thordarson | |
| 6,510,746 B1 | 1/2003 | Kotwicki | |

(Continued)

FOREIGN PATENT DOCUMENTS
EP 1475684 A 11/2004
(Continued)

OTHER PUBLICATIONS

Office Action with search report and English Translation for ROC (Taiwan) Patent Application No. 095103946, mailed Sep. 10, 2010, 9 pgs.

(Continued)

*Primary Examiner* — Kevin L Lee
(74) *Attorney, Agent, or Firm* — Sprinkle IP Law Group

(57) ABSTRACT

One embodiment of the present invention can include a flow control device that comprises an inlet, an outlet in fluid communication with the inlet, a pressure sensor, which may or may not be the only pressure sensor of the fluid control device, and a controller coupled to the pressure sensor. The controller can be configured to generate a valve control signal based on a measured pressure at a single pressure sensor.

20 Claims, 5 Drawing Sheets

U.S. PATENT DOCUMENTS

| | | | |
|---|---|---|---|
| 6,564,825 | B2 | 5/2003 | Lowery et al. |
| 6,564,874 | B2 | 5/2003 | Narvaez |
| 6,595,295 | B1 | 7/2003 | Berry |
| 6,631,882 | B2 | 10/2003 | Mack |
| 6,709,241 | B2 | 3/2004 | Sabini |
| 6,725,731 | B2 | 4/2004 | Wiklund |
| 6,843,439 | B1 | 1/2005 | Grice |
| 6,973,375 | B2 | 12/2005 | Brodeur |
| 7,004,453 | B1 | 2/2006 | Cheng |
| 7,032,606 | B1 | 4/2006 | Lucas, Jr. |
| 7,073,392 | B2 | 7/2006 | Lull et al. |
| 7,610,117 | B2 | 10/2009 | Brodeur et al. |
| 7,740,024 | B2 | 6/2010 | Brodeur et al. |
| 2003/0061888 | A1 | 4/2003 | Gould |
| 2004/0016431 | A1 | 1/2004 | Preveyraud |
| 2004/0204794 | A1 | 10/2004 | Ohmi et al. |

FOREIGN PATENT DOCUMENTS

| | | |
|---|---|---|
| JP | 01-222138 A | 9/1989 |
| JP | 2003-195948 | 7/2003 |
| WO | WO 00/61215 A1 | 10/2000 |
| WO | WO 03/058363 A1 | 7/2003 |
| WO | WO 2005/081169 A1 | 9/2005 |

OTHER PUBLICATIONS

Japanese Office Action and English translation issued for Japanese Patent Application No. 2006-553241, issued Jul. 16, 2010, 10 pgs.
Office Action in U.S. Appl. No. 10/777,300 mailed Mar. 22, 2005, 7 pgs.
International Search Report and Written Opinion dated Jun. 16, 2005 in PCT/US2005/04276, 11 pgs.
Office Action in U.S. Appl. No. 11/229,912 mailed Dec. 7, 2005, 6 pgs.
Office Action in U.S. Appl. No. 11/229,912 mailed Jul. 10, 2006, 5 pgs.
Office Action in U.S. Appl. No. 11/054,467 mailed Sep. 28, 2006, 6 pgs.
Office Action in U.S. Appl. No. 11/229,912 mailed Jan. 4, 2007, 5 pgs.
Office Action in U.S. Appl. No. 11/054,467 mailed Mar. 27, 2007, 9 pgs.
Office Action in U.S. Appl. No. 11/229,912 mailed Jun. 25, 2007, 5 pgs.
Office Action in U.S. Appl. No. 11/054,467 mailed Sep. 17, 2007, 9 pgs.
Office Action in U.S. Appl. No. 11/229,912 mailed Dec. 13, 2007, 7 pgs.
Office Action in U.S. Appl. No. 11/054,467 mailed Feb. 20, 2008, 8 pgs.
Office Action in U.S. Appl. No. 11/229,912 mailed Mar. 17, 2008, 6 pgs.
Office Action in U.S. Appl. No. 11/229,912 mailed Sep. 16, 2008, 8 pgs.
Office Action in U.S. Appl. No. 11/054,467 dated Jan. 5, 2009, 6 pgs.
International Preliminary Report on Patentability issued Aug. 14, 2006 in PCT/US2005/04276, 6 pgs.
European Search Report in 05722929.6 dated Apr. 21, 2008, 3 pgs.
Office Action in Chinese Patent Application No. 200580004624.4 dated Jun. 20, 2008 and English Translation, 11 pgs.
Office Action in Chinese Patent Application No. 200580004624.4 dated Dec. 5, 2008 and English Translation, 7 pgs.
Intellectual Property Office of Singapore Search Report and Written Opinion in Application No. 200705754-0, Austrian Patent Office, mailed Jul. 7, 2009, 11 pgs.
Office Action issued in Japanese Patent Application No. 2006-553241, mailed Feb. 3, 2010, and English Translation, 12 pgs.
Final Office Action and English Translation for Japanese Patent Application No. 2006-553241, issued Nov. 2, 2010 and mailed on Nov. 5, 2010, 5 pgs.
Office Action issued for Taiwan Application No. 094104063 mailed May 5, 2011, 5 pages.
English translation of Office Action issued in Taiwan Patent Application No. 094104063, mailed May 5, 2011, 3 pgs.

* cited by examiner

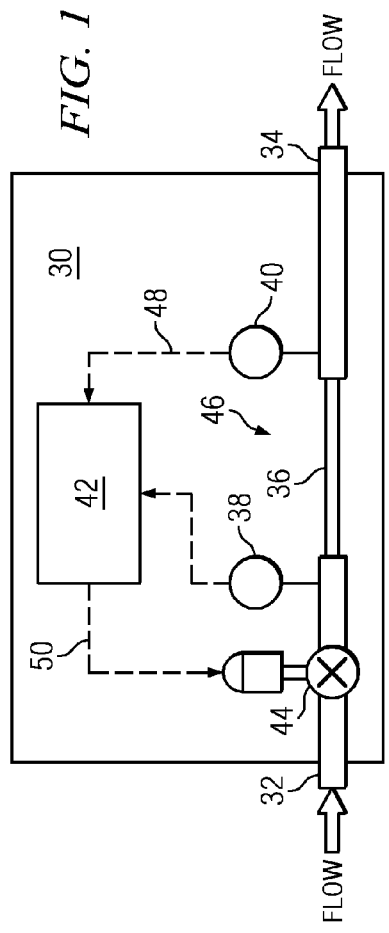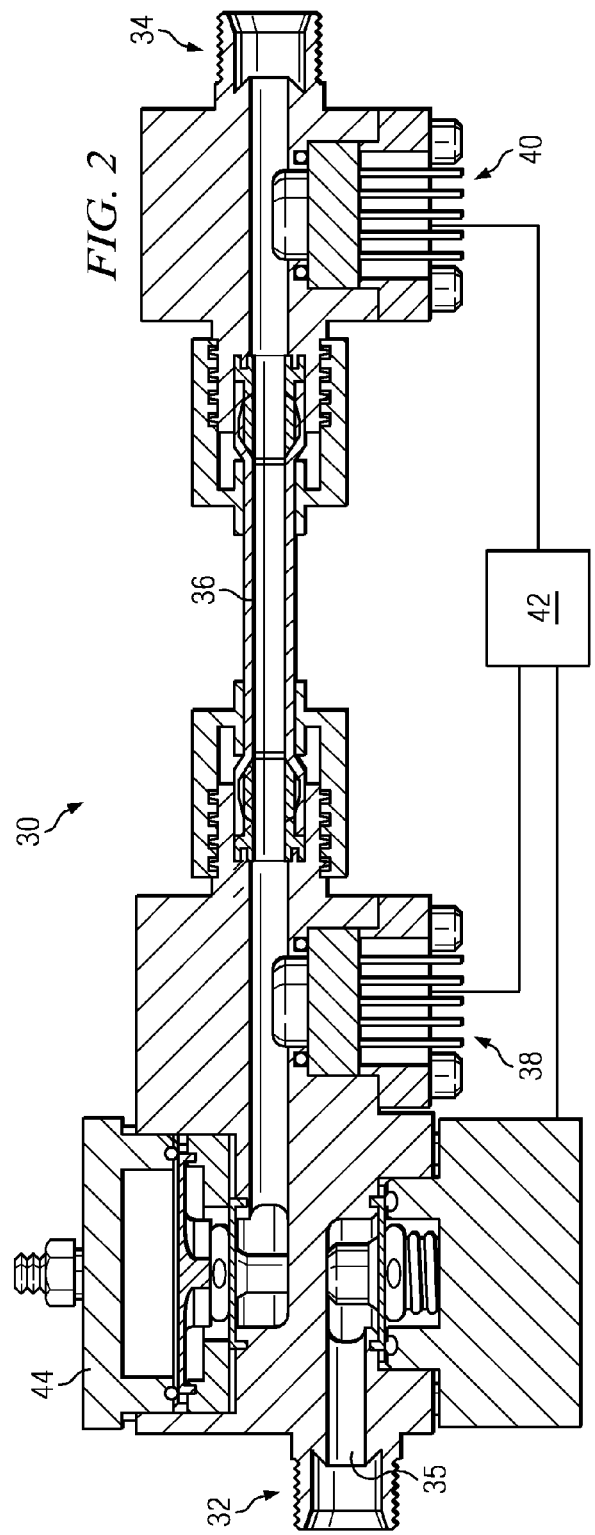

SYSTEM AND METHOD FOR FLOW MONITORING AND CONTROL

RELATED APPLICATIONS

This application is a continuation of and claims the benefit of priority under 35 U.S.C. §120 of U.S. patent application Ser. No. 11/054,467, entitled "System and Method for Flow Monitoring and Control" by Brodeur et al., filed Feb. 9, 2005 now U.S. Pat. No. 7,740,024, which is a continuation-in-part of and claims the benefit of priority under 35 U.S.C. §120 of U.S. patent application Ser. No. 10/777,300, entitled "System and Method for Flow Monitoring and Control" by Brodeur et al., filed Feb. 12, 2004, issued as U.S. Pat. No. 6,973,375 on Dec. 6, 2005; the contents of applications referenced herein are hereby expressly incorporated by reference for all purposes.

FIELD OF THE INVENTION

Embodiments of the present invention relate generally to the field of flow monitoring and control and more particularly to monitoring and/or controlling flow over a range of flow rates.

BACKGROUND

In semiconductor manufacturing, accurate control of fluid flow through manufacturing tools is critical for the precise fabrication of circuits on substrates. To control fluid flow in current semiconductor manufacturing systems, a mass flow meter determines the flow rate of a fluid in the system and, if the flow rate should be adjusted, a mass flow controller opens or closes a valve accordingly. Many current systems rely on pressure differential mass flow meters, though thermal mass flow meters are becoming more common. In a pressure differential mass flow meter, two pressure sensors read the pressure drop across a constriction, which acts as a pressure loss inducing element, having a known area to calculate the flow rate of a gas based on known principles of fluid dynamics. Using the calculated gas flow rate, the mass flow controller can adjust a valve to increase or decrease the flow rate.

Prior art systems that rely on pressure differentials across a constriction typically have a limited range of operation. More particularly, the range of operation is often limited at low flow rates because the pressure differential between the two sensors becomes so small as to be indiscernible compared to system noise. Thus, for example, even if a flow controller is physically capable of controlling flows at rates of 0-100 mL per second, the controller may only be able to accurately control flows having rates of 20-100 mL per second because, beneath 20 mL per second, the pressure differential from the two pressure sensors is indiscernible.

In order to extend the working range to lower flow rates, in some prior art systems, a constriction with a smaller cross-sectional area is employed to increase the sensed pressure differential. While this may allow the flow meter to detect lower flow rates, employing a more restrictive constriction reduces the maximum flow capacity of the meter for a given fluid supply pressure and is often an unsatisfactory solution.

SUMMARY OF THE DISCLOSURE

Embodiments of the present invention provide systems and methods of flow monitoring and control that reduce the disadvantages of previously developed flow monitoring and control systems and methods. More particularly, embodiments of the present invention provide a flow control device that can control flow using a single pressure sensor.

Embodiments of the present invention can also include a flow control device that can determine if a change has occurred that may require recalibration of the flow control device. In one embodiment of the present invention, a controller can monitor a pressure sensor (e.g., a downstream pressure sensor) for fluctuations. If the fluctuations exceed a predetermined amount, the controller can generate an alarm indicating that the flow device may have to be recalibrated.

One embodiment of the present invention can include a flow control device comprising an inlet, an outlet in fluid communication with the inlet, a pressure loss element between the inlet and outlet in fluid communication with the inlet and outlet, a pressure sensor located upstream from the pressure loss element configured to measure a first pressure of a fluid flowing through the flow control device, a pressure sensor located downstream from the pressure loss element, configured to measure a second pressure of the fluid flowing through the flow control device, and a controller coupled to the first pressure sensor and the second pressure sensor to generate a valve drive signal. The controller can generate a valve control signal based on a differential between the first pressure and the second pressure during a first mode of operation. The controller can also generate a valve control signal based on a measured pressure at a particular pressure sensor during a second mode of operation. The mode of operation can automatically switch based on a predefined parameter (e.g., a preset differential, a preset pressure at one of the sensor, a fluctuation in the readings of a particular sensor or other parameter).

Another embodiment of the present invention can include a computer program product comprising a set of computer instruction stored on at least one computer readable medium and executable by at least one processor to: receive a measurement of a first pressure; receive a measurement of a second pressure; operate according to a first mode of operation, wherein the computer instructions are executable to calculate a flow rate based on a differential between the first pressure and the second pressure; operate according to a second mode of operation, wherein the computer instructions are operable to calculate the flow rate based on a measured pressure at a particular pressure sensor; and switch between the first mode of operation and the second mode of operation based on a predefined parameter.

Yet another embodiment of the present invention can include measuring a first pressure; measuring a second pressure; in a first mode of operation, generating a valve control signal based on a differential between the first pressure and the second pressure; in a second mode of operation, generating the valve control signal based on a measured pressure at a particular pressure sensor; and switching between the first mode of operation and the second mode of operation according to a predefined parameter.

Yet another embodiment of the present invention can include a set of computer instructions executable to receive pressure measurements from a sensor, monitor the pressure measurements for a fluctuation, compare the fluctuation to a predetermined limit and, if the fluctuation is greater than the predetermined limit, generate an alarm.

Yet another embodiment of the present invention can include a set of computer instructions executable to receive an upstream pressure from an upstream sensor located upstream of a pressure loss element, receive a downstream pressure measurement from a downstream of the pressure loss element, monitor a valve for a valve position, determine a differential between the measured pressures and determine a control resolution based on the differential between the measured pressures, the valve position and a valve resolution.

Yet another embodiment of the present invention can include a method of monitoring flow comprising measuring a first pressure, measuring a second pressure; in a first mode of operation, determining a flow rate based on a differential between the first pressure and the second pressure; in a second mode of operation, determining the flow rate based on a measured pressure at a particular pressure sensor; and switching between the first mode of operation and the second mode of operation according to a predefined parameter.

Yet another embodiment of the present invention can include a computer program product comprising a set of computer instructions stored on at least one computer readable medium executable by at least one processor to: receive a measurement of a first pressure; receive a measurement of a second pressure; operate according to a first mode of operation, wherein the computer instructions are executable to generate a valve control signal based on a differential between the first pressure and the second pressure; operate according to a second mode of operation, wherein the computer instructions are operable to generate the valve control signal based on a measured pressure at a particular pressure sensor; and switch between the first mode of operation and the second mode of operation according to a predefined parameter.

Yet another embodiment of the present invention includes a flow control device that comprises an inlet, an outlet in fluid communication with the inlet, a first pressure sensor, which may be the only pressure sensor of the fluid control device, and a controller coupled to the pressure sensor. The controller can be configured to generate a valve control signal based on a measured pressure at a single pressure sensor (i.e., the first pressure sensor of the fluid control device).

Another embodiment of the present invention includes a method for regulating flow through a flow control device based on measurements from a single pressure sensor, the method comprising measuring pressure at a first pressure sensor, calculating a flow rate based on a pressure measurement from the first pressure sensor and a set of calibration parameters, comparing the flow rate to a set point and generating a valve control signal based on the difference between the calculated flow rate and set point.

Yet another embodiment of the present invention includes a computer program product that comprises a set of computer instructions having instructions executable to receive a pressure measurement from a first pressure sensor, calculate a flow rate based on the pressure measurement from the first pressure sensor and a set of calibration parameters, compare the flow rate to a set point; and generate a valve control signal based on the difference between the calculated flow rate and set point.

Embodiments of the present invention provide an advantage over prior art flow control devices by providing for a greater range of flow control.

Embodiments of the present invention provide another advantage over prior art flow control devices by providing for greater accuracy in measuring flow rate at low flow rates.

Embodiments of the present invention provide yet another advantage over prior art flow control devices by providing monitoring to indicate if recalibration is necessary or an error has occurred.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein:

FIG. 1 is a diagrammatic representation of a schematic of a flow control device according to one embodiment of the present invention;

FIG. 2 is a diagrammatic representation of one embodiment of a flow control device;

DETAILED DESCRIPTION

Figure 3:
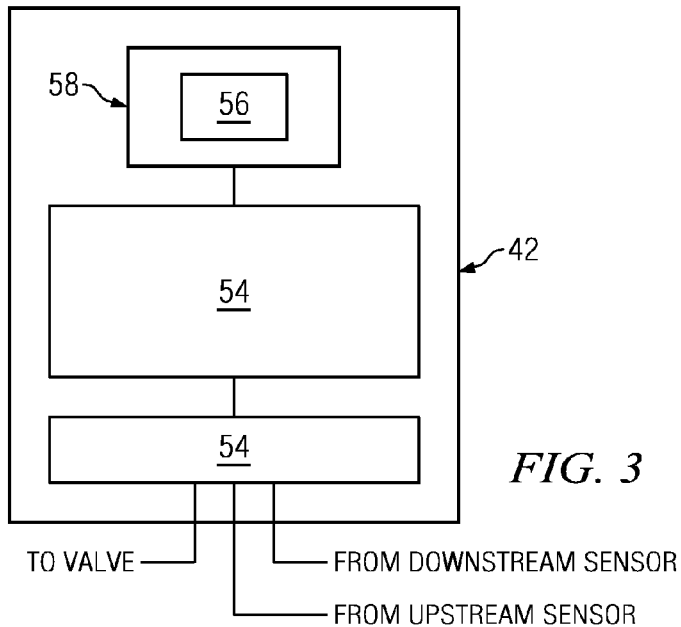
FIG. 3 is a diagrammatic representation of one embodiment of a controller.

Preferred embodiments of the invention are illustrated in the FIGURES, like numerals being used to refer to like and corresponding parts of the various drawings.

Embodiments of the present invention provide a flow controller that can reduce or eliminate problems associated with prior art flow control systems and methods. One embodiment of the present invention includes a flow controller that has an upstream and downstream pressure sensor. In one mode of operation, the flow controller can control the flow rate based on the pressure differential between the pressure measurements from the upstream and downstream sensors. In another mode of operation, the pressure controller can control the flow rate based on the pressure sensed by a particular pressure sensor, such as the downstream pressure sensor. The flow controller can include logic to automatically switch between the modes of operation. The first mode of operation can be associated with higher flow rates, while the second mode of operation can be associated with lower flow rates.

FIG. 1 is a diagrammatic representation of a flow control device 30, according to one embodiment of the present invention. Flow control device 30 can include an inlet 32 for receiving a flow, an outlet 34 for directing a flow to other components of a flow system, pressure loss element 36 (e.g., an orifice plate, small diameter tube, a constricted area or other pressure loss element), a pressure sensor 38 upstream of pressure loss element 36 (referred to as the "upstream pressure sensor") configured to measure an upstream pressure, a pressure sensor 40 downstream of pressure loss element 36 (referred to as the "downstream pressure sensor") configured to measure a downstream pressure, a controller 42, which can include processors, memories and software instructions for determining a fluid flow rate and/or for generating a valve control signal, and a valve 44 (e.g., a throttling gate valve, a poppet valve, a butterfly valve, a pneumatically driven valve or other valve known in the art) responsive to the valve control signal to regulate fluid flow.

Upstream pressure sensor 38 and downstream pressure sensor 40 can be capacitance type, piezoresistive type, transducer type or other type of pressure sensor known in the art.

The portions of upstream pressure sensor 38 and downstream pressure sensor 40 exposed to the fluid flowing through flow control device 30 can be chemically inert with respect to the fluid. Controller 42 can be coupled to upstream pressure sensor 38, downstream pressure sensor 40 and valve 44 via, for example, electrical connections. The valve can include a valve drive having components, such as microcontrollers, to process the valve control signal and open or close valve 44 in response to the valve control signal.

A fluid (gas or liquid) can enter flow control device 30 at inlet 32, pass through valve 44 and pressure loss element 36 and exit flow control device 30 at outlet 34. Upstream pressure sensor 38 and downstream pressure sensor 40 can generate upstream pressure signal 46 and downstream pressure signal 48, which can be digital or analog signals that represent the pressure measurements at upstream pressure sensor 38 and downstream pressure sensor 40, respectively.

Controller 42, using, for example, software instructions stored on a computer readable medium, can generate valve control signal 50 to open or close valve 44 to achieve a desired flow rate based on the pressures measured by upstream pressure sensor 38 and/or downstream pressure sensor 40. According to one embodiment of the present invention, controller 42 can determine a differential between the upstream pressure measurement and the downstream pressure measurement. The differential can be any representation of the difference between the pressure measurements at upstream pressure sensor 38 and downstream pressure sensor 40. For example, the differential can be represented as a pressure value (e.g., 100 Pa) or as a signal having a particular voltage value (e.g., 100 mV), or in any other format that represents the difference between the pressure measurements. Controller 42 can compare the differential to a set point to generate valve control signal 50 according to any control scheme (e.g., proportional-integral ("PI") control scheme, proportional-integral-derivative ("PID") control scheme, or any other control scheme known or developed in the art). Based on control signal 50, valve 44 can open or close to regulate the flow rate.

Calculating flow rates based on the differential between measured pressures at upstream pressure sensor 38 and downstream pressure sensor 40 can provide acceptable accuracy at higher flow rates. However, as the flow rate decreases, the signal to noise ratio of upstream pressure sensor 38 and downstream pressure sensor 40 can become so low that it is difficult to make an accurate flow rate calculation based on the differential of measured pressures. In other words, at low flow rates, the pressure differential can become indiscernible from noise. To address this issue, controller 42, according to one embodiment of the present invention, can switch to calculating the flow rate based on the pressure measured at a single flow sensor.

Controller 42 can calculate the flow rate based on the pressure sensed by a particular pressure sensor based on known fluid dynamic equations and/or empirical comparisons of sensor readings to flow rates established during calibration. According to one embodiment of the present invention, flow control device 30 can be calibrated at installation to determine the correlation between sensed pressure at a particular sensor and the flow rate in the system in which flow control device 30 is installed. This can include calibrating flow control device 30 to account for pressure losses caused by components downstream of flow control device 30 that affect the calculated flow rate. Based on this calibration, controller 42 can generate valve control signal 50 responsive to a pressure signal from a particular sensor (e.g., upstream pressure sensor 38 or downstream pressure sensor 40) to regulate the fluid flow rate. It should be noted that when controller 42 is generating the control signal based on the measurements of a particular sensor, the other sensor can be in an "off" state or can continue sending pressure measurements to controller 42.

The switch between calculating the flow rate based on a differential to calculating the flow rate based on the pressure measured by a particular pressure sensor can occur at any arbitrarily defined point. By way of example, but not limitation, controller 42 can make the switch when the differential becomes sufficiently small, the pressure measured at a particular sensor falls below a specified level or the fluctuations in either or both sensors exceeds a limit where a single sensor would provide a more accurate flow.

Thus, one embodiment of the present invention can include a flow control device that comprises an inlet, an outlet, a pressure loss element in fluid communication with the inlet and the outlet, an upstream pressure sensor, a downstream pressure sensor and a controller. The upstream pressure sensor can measure an upstream pressure and the downstream pressure sensor can measure a downstream pressure. Over a first range of flow rates, the controller can generate a valve control signal based on the differential in the measured pressures. Over a second range of flow rates, the controller can generate a valve control signal based on the pressure measured at the upstream or downstream pressure sensor. The flow control device can further include a valve that can open or close in response to the valve control signal. The controller can automatically switch between the first mode of operation (i.e., basing the control signal on the differential) and the second mode of operation (basing the control signal on the pressure at a particular sensor) at a predefined point.

FIG. 2 is a diagrammatic representation of one embodiment of flow control device 30. Flow control device 30 can include an inlet 32 for receiving a flow, an outlet 34 for directing a flow to other components of a flow system, a flow passage 35, for directing fluid from inlet 32 to outlet 34, a pressure loss element 36, an upstream pressure sensor 38, a downstream pressure sensor 40, a controller 42 to generate a valve control signal, and a valve 44 to regulate fluid flow responsive to the valve control signal.

Controller 42 can receive signals from upstream pressure sensor 38 and downstream pressure sensor 40 representing the measured pressure at the respective sensor. The signal can be an analog or digital signal that can represent the measured pressure by voltage level, as bits representing the measured pressure or in any other manner known in the art. Controller 42 can determine a differential between the measured pressures, by for example, generating a difference signal and/or calculating a pressure difference. Controller 42 can generate a valve control signal based on the differential or based on the pressure signal received from the upstream and/or downstream pressure sensor. Valve 44 can open or close responsive to the received valve control signal.

FIG. 3 is a diagrammatic representation of one embodiment of controller 42. Controller 42 can include an analog to digital (A/D) converter 52 to receive signals from the upstream pressure sensor and downstream pressure sensor and convert the received signals to a digital format. Processor 54 (e.g., CPU, ASIC, or other processor known in the art) can receive digital values from A/D converter 52, representing the measured pressures, and calculate a differential. Based on the differential or the measured pressure from either the upstream or downstream sensor, processor 54 can generate a digital control signal that represents how much a valve should open or close to regulate fluid flow. A/D converter 52 can convert the digital value to an analog valve control signal and send the analog control valve signal to the valve.

Processor 54 can generate the digital control signal by executing a software program that can include a control algorithm, stored as a set of computer instructions 56 on a computer readable memory 58 (e.g., EEPROM, RAM, ROM, flash memory, magnetic storage, optical storage or other computer readable memory known in the art), accessible by processor 54. In one mode of operation, the control algorithm can use operator, calibration and/or factory parameters to calculate the digital control signal based on the differential between measured pressures or, in another mode of operation, the control algorithm can use the measured pressure at an upstream or downstream pressure sensor to calculate the digital control signal. The control algorithm can automatically switch between the first mode and the second mode at a predefined point. For example, the control algorithm can switch from the first mode to the second mode when the differential drops below a predefined level. Processor 54 can determine whether to switch between the first mode of operation and the second mode of operation each cycle or on a predetermined schedule.

The control algorithm can calculate the digital control signal for a particular mode of operation using any control scheme known in the art, including, but not limited to, a PID, a modified PID with offset or other control algorithm known in the art. The basic operation creates an error signal. The error signal is then corrected for the particular valve. The corrected error signal is converted from digital format to an analog signal by A/D converter 52, and the resulting analog signal is sent to a voltage-to-current converter that drives the control valve to a new position.

Controller 42 can include additional input/output capabilities. For example, controller 42 can include a serial interface to support administrative functions such as updating computer instructions 56. Additionally, controller 42 can include network interfaces to communicate with other flow control devices, administrative computers or other device capable of communicating over a network.

Computer instructions can implement the control algorithm in a variety of manners. For example, the control signal can be based on comparing a calculated value (e.g., a calculated pressure value, pressure differential value, or calculated flow rate value) to a set point. As another example, rather than digitally calculating the differential between measured pressures, the controller can calculate the differential between measured pressures by generating a differential signal using a summer. In this case, the control signal, in the first mode of operation, can be based on comparing the differential signal to a set point. In the second mode of operation, the controller can compare a pressure signal to a set point, rather than a calculated pressure value.

Figure 4:
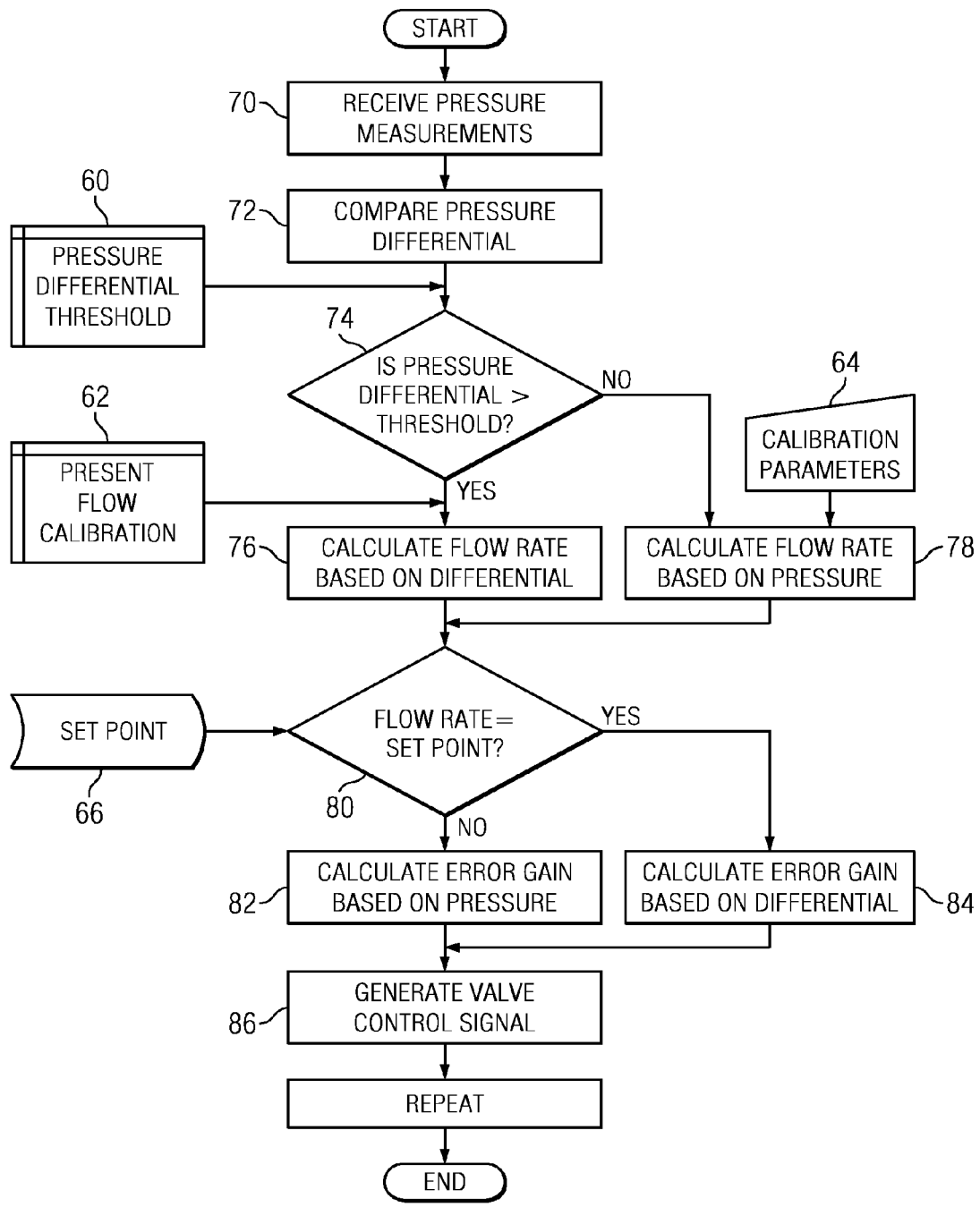
FIG. 4 is a flow chart of one embodiment of a method for controlling flow.

FIG. 4 is a flow chart illustrating a method of controlling flow according to one embodiment of the present invention. The method of FIG. 4 can be implemented by a controller having one or more processors executing a set of computer instructions (e.g., a software program) stored on a computer readable medium. The controller can use a number of input parameters in generating a control signal, including pressure differential threshold 60, preset flow calibration parameters 62, in situ flow calibration parameters 64 and set point 66, and can calculate a flow rate based on a differential between measured pressures or the pressure at a particular sensor. The input parameters can be stored on a computer readable medium (e.g., RAM, ROM, magnetic storage device or other computer readable medium known in the art).

Pressure differential threshold 60 can be used to determine when the controller switches between generating the control signal based on the differential between sensed pressures or a particular sensed pressure. According to one embodiment of the present invention, pressure differential threshold 60 can be calculated based on the downstream pressure, the differential pressure, the supply pressure and the valve position. In determining pressure differential threshold 60, fluid can be run through the flow control device until a differential pressure of approximately 10% of the full scale (i.e., the supply pressure) of the flow control device is achieved. For example, if the supply pressure is 100 psi, the controller can adjust the valve until a differential pressure of 10 psi is achieved. At this point, the downstream pressure and valve position can be measured by the controller. The downstream pressure determines the "load" of the system and the valve position gives an indication of the supply pressure and the effective remaining range of the valve.

With the above values, the control resolution of the flow control device can be determined as follows:

$$\text{Res} = (dP\%/(\text{valve position }\%))*\text{valve resolution(psi/step)} \quad [\text{EQ 1}]$$

where:
dP %=differential pressure as a percentage of the supply pressure of the flow control device,
valve position %=is the percent the valve is open;
valve resolution=the resolution of the particular valve, typically determined by the valve manufacturer.

If the control resolution as determined by [EQ. 1] is insufficient in comparison to a desired control resolution value, meaning the slope is too high, the controller can adjust the valve to achieve a higher pressure differential. When the control resolution yielded by [EQ. 1] is deemed sufficient, the corresponding differential pressure can be selected as pressure differential threshold 60. This point acts as a proxy to the point at which the signal to noise ratio of the sensors prevents an accurate pressure differential reading. According to one embodiment of the present invention, determining differential pressure threshold 60 can be performed automatically by the controller. It should be noted, in other embodiments of the present invention, pressure differential threshold 60 can be determined by other schemes or can be determined arbitrarily.

In situ flow calibration parameters 64 can include parameters calculated for a particular flow control device based on installation of the flow control device in a flow system. In situ flow calibration parameters reflect the fact that devices downstream from the flow control device will affect the pressures sensed at the flow control device. While this may have little affect on flow rates calculated based on a pressure differential, it can significantly affect the flow rate calculated from a particular pressure sensor. Therefore, a flow control device can be recalibrated after installation to establish in situ flow calibration parameters 64 that account for downstream devices. The in situ calibration can be done, for example, by manually entering system specific values or by an automated software controlled device routine. Because the controller will typically determine the flow rate based on the pressure at a particular sensor at lower flow rates, calibration parameters 64 can be established, in one embodiment of the present invention, based on laminar flow of a fluid through the fluid control device. As long as the flow rate corresponds to laminar flow, compensation for fluid viscosity and downstream pressure loses requires only an offset value to be used as the in situ flow calibration parameter 64.

Preset flow calibration parameters 62 can include parameters used for calculating a flow rate based on gas type, flow control device setup or other parameter. Preset flow calibration parameters 62 can be established according to any calibration technique known in the art. Set point 66 represents a desired flow rate. The calculated flow rate can be compared to set point 66 to determine how much to open or close a valve. Set point 66 can be updated automatically by, for example, a remote computer, by an operator, or in any manner known in the art.

The controller, at step 70, can receive pressure measurements from an upstream and downstream pressure sensor and, at step 72, can calculate a pressure differential. At step 74, the controller can compare the calculated pressure differential to pressure differential threshold 60. If the calculated pressure differential is greater than pressure differential threshold 60, control can pass to step 76, otherwise control can pass to step 78.

At step 76, the controller can calculate the flow rate based on the differential between measured pressures using preset flow calibration parameters 62. This can be done according to any scheme for calculating a flow rate based on a differential in measured pressures known in the art. At step 78, on the other hand, the controller can use in situ flow calibration parameters 64 to determine the flow rate. This can be done according to any scheme for calculating a flow rate based on a single pressure, including comparing the measured pressure to a calibration curve of flow rates (stored, for example, in the memory of the controller or other computer readable medium accessible by the controller).

The controller, at step 80, can compare the calculated flow rate to a set point. If the flow rate does not equal the set point, the controller, at step 82, can calculate an error gain based on the pressure from a particular sensor (e.g., the measured pressure from the downstream sensor). If, conversely, the flow rate does equal the set point, the controller can calculate the error gain based on the differential between the measured pressures (step 84). At step 86, the controller can convert the error gain to an analog valve control signal and communicate the valve control signal to a valve. Steps 70-84 can be repeated.

It should be noted that, at step 74, the controller determined whether to calculate flow rate based on the differential in measured pressures or based on the pressure at a particular sensor. This determination can be made each time a flow rate is to be calculated. In another embodiment of the present invention, this determination can be made according to a predefined schedule (e.g., every 30 milliseconds). In this embodiment of the present invention, the controller can calculate the flow rate according to a particular mode of operation (e.g., according to step 76 or step 78) for a predetermined period of time, before determining whether it should switch to the other mode of operation. Moreover, steps 70-78 can be carried out by a mass flow meter to determine a flow rate. In this case, the pressure differential threshold 60 (or other preset parameter) can be arbitrarily determined.

As described in conjunction with FIG. 4, the flow rate can be calculated based on the pressure reading from a single sensor by calibrating the flow control device at installation to account for the pressure drops caused by downstream components. If the downstream components change, the required offset may also change. This can occur if new tubing is installed, the flow control unit is moved, a downstream filter becomes restricted, loose tubing shifts during a dispense process or any other event occurs that can affect the sensor readings.

According to one embodiment of the present invention, the controller, using computer instructions stored in a computer readable medium accessible by the controller, can monitor one or both of the upstream and downstream sensors to ensure that the pressure measurements of the sensors do not fluctuate outside of a desired range. For example, if the upstream pressure sensors measures 0.75 psi and the downstream pressure sensor measures 0.25 psi during a dispense process, the controller can be configured to generate an alarm if the downstream sensor reads outside of +/−0.05 psi limit (0.45 to 0.55 psi differential) during the dispense process, while controlling with the downstream sensor. An alarm based on a fluctuation in a pressure sensor can indicate that the system has changed, requiring recalibration of the flow control device or that the flow control device is not functioning properly. If the controller did not monitor fluctuations, the downstream sensor reading could increase to 0.5 psi (indicating a 0.25 psid pressure increase from the system after the controller) leading to change a decrease in the actual flow rate (e.g., 50% of the calculated value).

Figure 5:
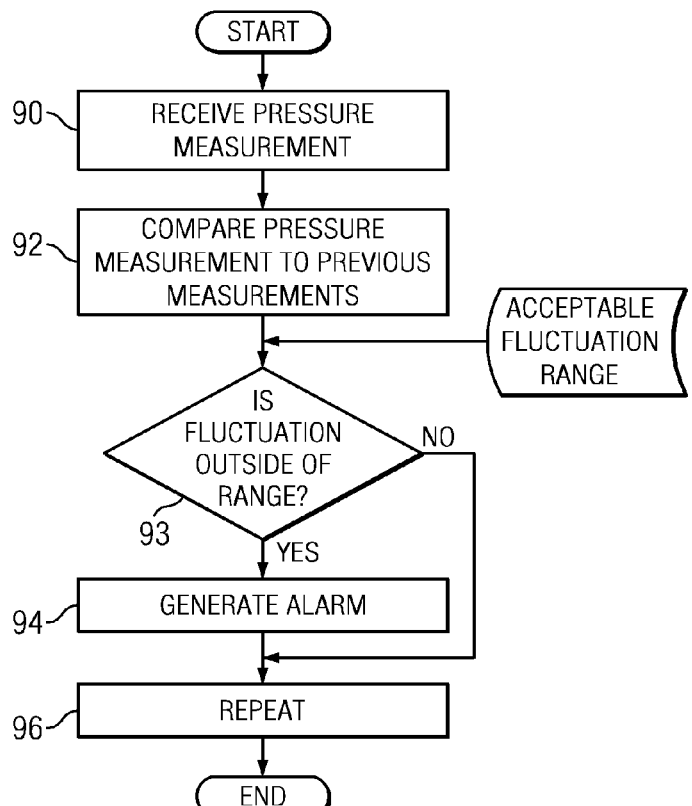
FIG. 5 is a flow chart of one method of monitoring a pressure sensor to determine if a downstream system has changed.

FIG. 5 is a flow chart illustrating one embodiment of a monitoring process. At step 90, the controller can receive pressure measurements from a sensor (e.g., the downstream sensor of FIG. 1). The controller at step 92, can compare the current pressure reading to one or more previous pressure readings to determine the fluctuation in the pressure sensor. If the fluctuation falls outside of a preset range, as determined at step 93, the controller, at step 94 can generate an alarm. The alarm can be an email notification, an audible alarm, a visual alarm or any other notification of an error condition known in the art. Steps 90-94 can optionally be repeated. The monitoring process of FIG. 5 can be implemented as a set of computer instructions in any flow control device capable of executing computer instructions and is not limited to flow control devices that provide multiple mode flow control as described in conjunction with FIGS. 1-4.

Figure 6:
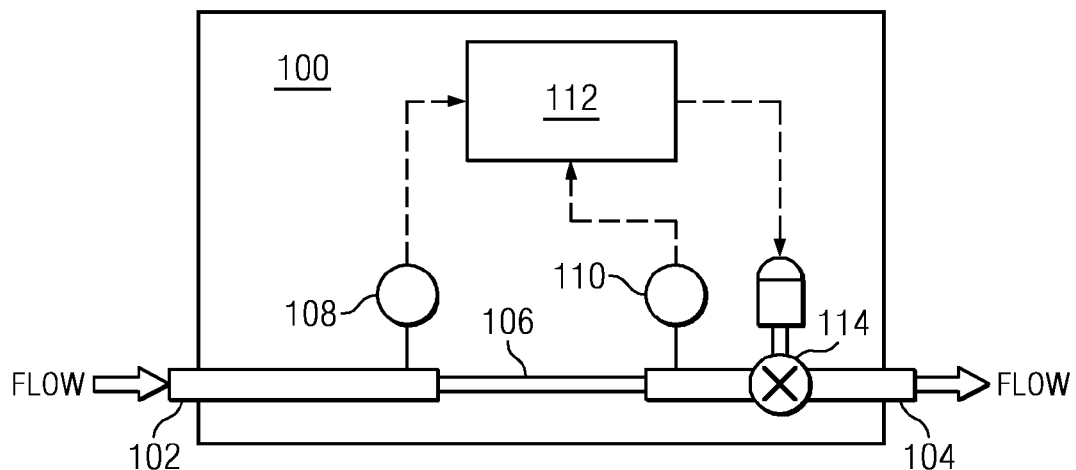
FIG. 6 is a diagrammatic representation of a schematic of a flow control device according to another embodiment of the present invention.

FIG. 6 is a diagrammatic representation of another embodiment of a flow control device 100. Flow control device 100 can include an inlet 102 for receiving a flow, an outlet 104 for directing a flow to other components of a flow system, a pressure loss element 106 (e.g., an orifice plate, small diameter tube, a constricted area or other pressure loss element), a pressure sensor 108 upstream of pressure loss element 106 (referred to as the "upstream pressure sensor") for sensing an upstream pressure, a pressure sensor 110 downstream of pressure loss element 106 (referred to as the "downstream pressure sensor") for sensing a downstream pressure, a controller 112 for generating a valve control signal, and a valve 114 (e.g., a throttling gate valve, a poppet valve, a butterfly valve, a pneumatically driven valve or other valve known in the art) responsive to the valve control signal to regulate fluid flow.

Upstream pressure sensor 108 and downstream pressure sensor 110 can be capacitance type, piezoresistive type, a transducer or other type of pressure sensor known in the art. Controller 112 can be coupled to upstream pressure sensor 108, downstream pressure sensor 110 and valve 114 via, for example, electrical connections. Although not shown for the sake of simplicity, there can be intervening logic between controller 112, upstream pressure sensor 108, downstream pressure sensor 110 and valve 114. Valve 114 can further include components, such as microcontrollers, to process the valve control signal and open or close the valve responsive to the valve control signal. Fluid control device 100 can function similarly to fluid control device 30 of FIG. 1, except that fluid will flow through the pressure loss element prior to flowing through the valve.

It should be noted that, in the embodiment of FIG. 6, because downstream pressure sensor 110 is upstream of valve 114, the pressure at downstream pressure sensor 110 may fluctuate, due to changes in valve 114. Therefore, to determine if the downstream system has changed and recalibration is necessary, a third sensor can be added downstream of valve 114. As described in conjunction with FIG. 5, the controller can monitor the fluctuations in pressure at the third sensor and, if the fluctuations are too great, can generate an alarm. In another embodiment, the valve position can be monitored. If the valve position changes by greater than a predetermined amount, the controller can generate an alarm.

Figure 7:
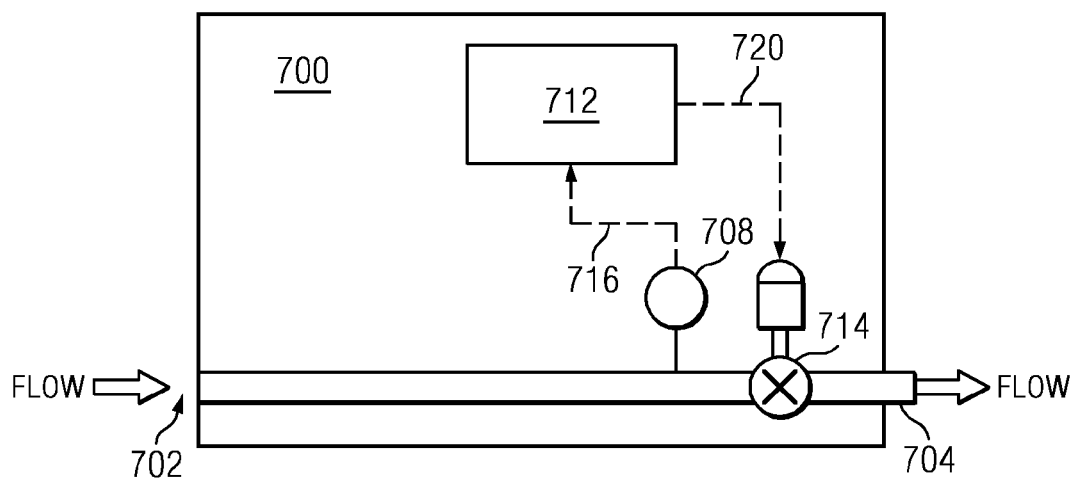
FIG. 7 is a diagrammatic representation of a flow control device using a single pressure sensor.

FIG. 7 is a diagrammatic representation of a flow control device 700, according to one embodiment of the present invention. Flow control device 700 can include an inlet 702 for receiving a flow, an outlet 704 for directing a flow to other components of a flow system, a pressure sensor 708, a controller 712, which can include processors, memories and software instructions for determining a fluid flow rate and/or for generating a valve control signal, and a valve 714 (e.g., a throttling gate valve, a poppet valve, a butterfly valve, a pneumatically driven valve or other valve known in the art) responsive to the valve control signal to regulate fluid flow.

Pressure sensor 708 can be capacitance type, piezoresistive type, transducer type or other type of pressure sensor known in the art. The portions of upstream pressure sensor 708 exposed to the fluid flowing through flow control device 700 can be chemically inert with respect to the fluid. Controller 712 can be coupled to pressure sensor 708, and valve 714 via, for example, electrical connections. The valve can include a valve drive having components, such as microcontrollers, to process the valve control signal and open or close valve 714 in response to the valve control signal.

A fluid (gas or liquid) can enter flow control device 700 at inlet 702, pass through valve 704 and exit flow control device 700 at outlet 704. Pressure sensor 708 can generate pressure signal 716, which can be a digital or analog signal that represents the pressure measurements at pressure sensor 708.

Controller 712, using, for example, software instructions stored on a computer readable medium, can generate valve control signal 720 to open or close valve 714 to achieve a desired flow rate based on the pressure measured by pressure sensor 708. According to one embodiment, controller 702, can calculate the flow rate based on the pressure measured at a single flow sensor.

Controller 702 can calculate the flow rate based on the pressure sensed by a particular pressure sensor based on known fluid dynamic equations and/or empirical comparisons of sensor readings to flow rates established during calibration. According to one embodiment of the present invention, flow control device 700 can be calibrated at installation to determine the correlation between sensed pressure at sensor 708 and the flow rate in the system in which flow control device 700 is installed. This can include calibrating flow control device 700 to account for pressure losses caused by components downstream of flow control device 700 that affect the calculated flow rate. Based on this calibration, controller 702 can generate valve control signal 720 responsive to a pressure signal from a particular sensor (e.g., sensor 708) to regulate the fluid flow rate.

Figure 8:
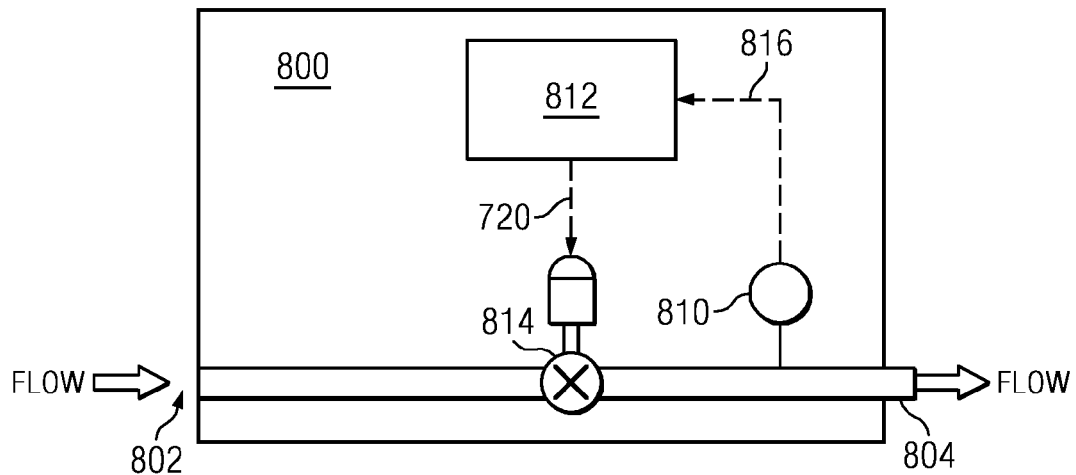
FIG. 8 is diagrammatic representation of another embodiment of a flow control device using a single pressure sensor.

FIG. 8 is a diagrammatic representation of another embodiment of a flow control device 800. Flow control device 800 can include an inlet 802 for receiving a flow, an outlet 804 for directing a flow to other components of a flow system a pressure sensor 810 for sensing a pressure, a controller 812 for generating a valve control signal, and a valve 814 (e.g., a throttling gate valve, a poppet valve, a butterfly valve, a pneumatically driven valve or other valve known in the art) responsive to the valve control signal to regulate fluid flow.

Pressure sensor 810 can be capacitance type, piezoresistive type, a transducer or other type of pressure sensor known in the art. Controller 812 can be coupled to pressure sensor 810 and valve 814 via, for example, electrical connections. Although not shown for the sake of simplicity, there can be intervening logic between controller 812, pressure sensor 810 and valve 814. Valve 814 can further include components, such as microcontrollers, to process the valve control signal and open or close the valve responsive to the valve control signal. Fluid control device 800 is similar to fluid control device 700 of FIG. 7 except that the pressure sensor is located downstream of the valve.

It should be noted that, in the embodiment of FIG. 8, because pressure sensor 810 is downstream of valve 814, the pressure at downstream pressure sensor 810 may fluctuate due to changes in valve 814. Therefore, to determine if the downstream system has changed and recalibration is necessary, an additional sensor can be added downstream of valve 814. As described in conjunction with FIG. 5, the controller can monitor the fluctuations in pressure at the additional sensor and, if the fluctuations are too great, can generate an alarm. In another embodiment, the valve position can be monitored. If the valve position changes by greater than a predetermined amount, the controller can generate an alarm.

Figure 9:
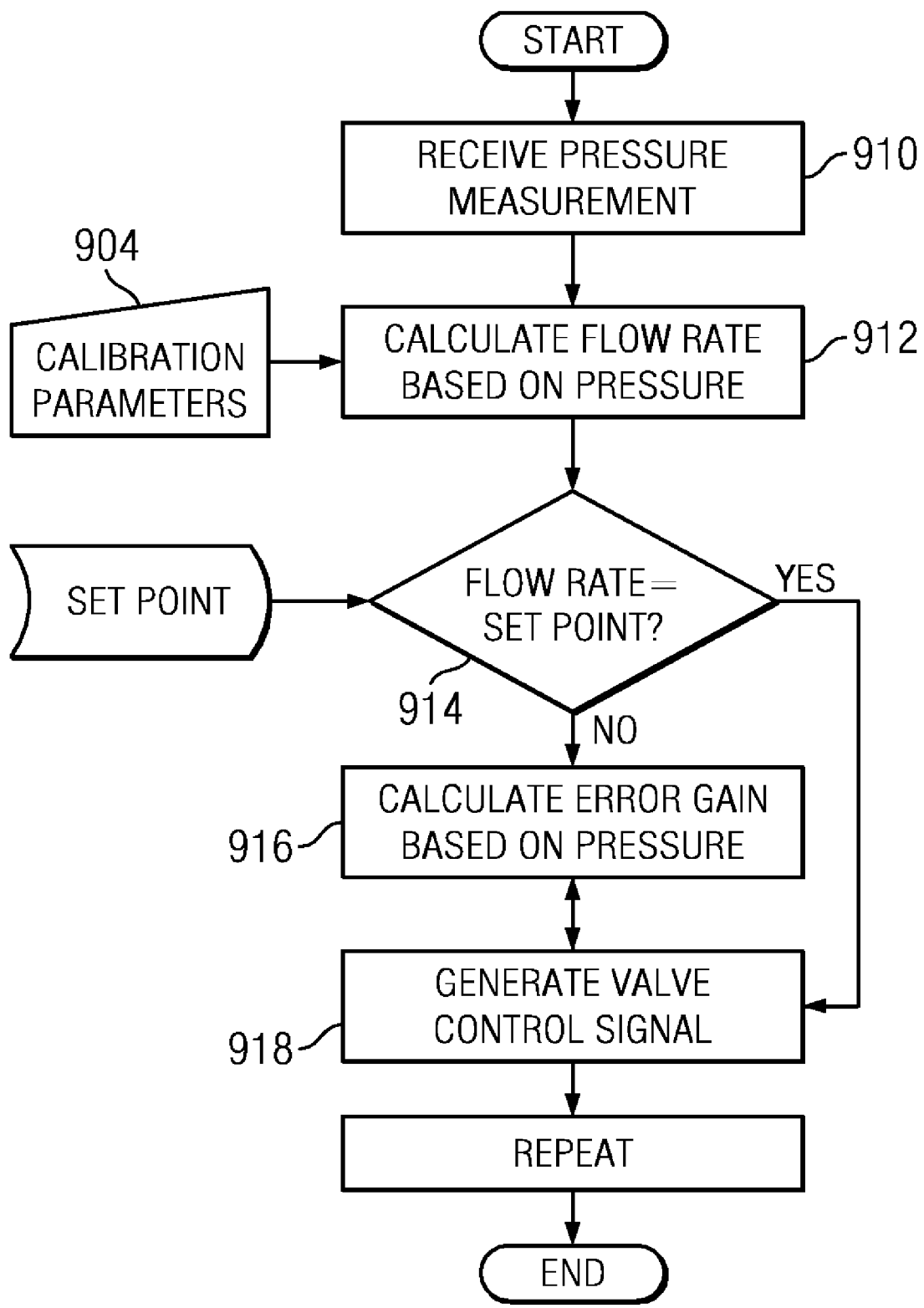
FIG. 9 is a flow chart of illustrating one embodiment of controlling flow using measurements from a single pressure sensor.

FIG. 9 is a flow chart illustrating one embodiment of method for flow control using a single sensor. The method of FIG. 9 can be implemented by a controller having one or more processors executing a set of computer instructions (e.g., a software program) stored on a computer readable medium. The controller can use a number of input parameters in generating a control signal including in situ flow calibration parameters 904. The input parameters can be stored on a computer readable medium (e.g., RAM, ROM, magnetic storage device or other computer readable medium known in the art).

In situ flow calibration parameters 904 can include parameters calculated for a particular flow control device based on installation of the flow control device in a flow system. In situ flow calibration parameters reflect the fact that devices downstream from the flow control device will affect the pressures sensed at the flow control device. While this may have little affect on flow rates calculated based on a pressure differential, it can significantly affect the flow rate calculated from a particular pressure sensor. Therefore, a flow control device can be recalibrated after installation to establish in situ flow calibration parameters 904 that account for downstream devices. The in situ calibration can be done, for example, by manually entering system specific values or by an automated software controlled device routine. Because the controller will typically determine the flow rate based on the pressure at a particular sensor at lower flow rates, parameters 904 can be established, in one embodiment of the present invention, based on laminar flow of a fluid through the fluid control device. As long as the flow rate corresponds to laminar flow, compensation for fluid viscosity and downstream pressure losses requires only an offset value to be used as the in situ flow calibration parameter 904.

The controller, at step 910, can receive a pressure measurement from a pressure sensor. At step 912, the controller can use in situ flow calibration parameters 904 to determine the flow rate. This can be done according to any scheme for calculating a flow rate based on a single pressure, including comparing the measured pressure to a calibration curve of flow rates (stored, for example, in the memory of the controller or other computer readable medium accessible by the controller).

The controller, at step 914, can compare the calculated flow rate to a set point. If the flow rate does not equal the set point, the controller, at step 916, can calculate an error gain based on the pressure from a particular sensor. At step 918, the controller can convert the error gain to an analog valve control signal and communicate the valve control signal to a valve.

The steps of FIG. 9 can be arbitrarily repeated as needed or desired. Additionally, it should be noted that control can occur based on a PI control routine, PID control routine or other control routine.

Thus, a flow control device with a single pressure sensor can control flow in the same manner as a flow control device having multiple sensors operating according to a mode of operation for controlling flow using a single sensor. The single pressure sensor flow controller can also include capabilities for monitoring fluctuations in pressure measurements at the single sensor (or other sensor) or fluctuations in valve position to generate alarms that may indicate a change in downstream pressure.

As described above, the flow rate can be calculated based on the pressure reading from a single sensor by calibrating the flow control device at installation to account for the pressure drops caused by downstream components. If the downstream components change, the required offset may also change. This can occur if new tubing is installed, the flow control unit is moved, a downstream filter becomes restricted, loose tubing shifts during a dispense process or any other event occurs that can affect the sensor readings. If the downstream components change, the flow control unit can be recalibrated to account for changes in the overall system (i.e., the in-situ calibration parameters can be updated).

It should be noted that the repeatability of control using a single sensor is dependent on the downstream pressure drop with repeatability generally increasing as the downstream pressure drop increases. If the downstream pressure drop in a particular in situ configuration is insufficient to produce adequate repeatability, additional tubing, such as coils, can be added downstream of the pressure sensor to increase the downstream pressure drop and increase repeatability.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed in the following claims.

What is claimed is:

1. A flow control device comprising:
   a housing;
   an inlet for receiving a flow into the flow control device;
   an outlet in fluid communication with the inlet for directing the flow out of the flow control device to components of a flow system;
   a valve located in the housing and between the inlet and the outlet and responsive to valve control signals for regulating the flow through the flow control device;
   a pressure sensor to measure a pressure of a fluid entering the flow control device at the inlet, passing the valve, and exiting the flow control device at the outlet along a single flow path, wherein the pressure sensor is the only sensor in the housing of the flow control device and wherein the flow control device is calibrated at installation; and
   a controller coupled to the pressure sensor, the controller configured to:
      determine a flow rate corresponding primarily to a pressure measured at the pressure sensor by comparing the pressure measured at the pressure sensor to a calibration curve of flow rates, the calibration curve correlating a sensed pressure at the pressure sensor and a corresponding flow rate in the flow system in which the flow device is installed, and
      generate a valve control signal responsive to the pressure measured at the pressure sensor to regulate the flow.

2. The flow control device of claim 1, wherein the pressure sensor is located upstream of the valve.

3. The flow control device of claim 1, wherein the pressure sensor is located downstream of the valve.

4. The flow control device of claim 1, wherein the controller is further operable to:
   receive pressure measurements from the pressure sensor;
   monitor the pressure measurements for a fluctuation;
   compare the fluctuation to a predetermined limit; and
   if the fluctuation is greater than the predetermined limit, generate an alarm.

5. The flow control device of claim 1, wherein the controller is further operable to:
   monitor the valve for a change in valve position; and
   if the change in valve position is greater than a predetermined amount, generate an alarm.

6. The flow control device of claim 1, wherein the controller is further configured to:
   compare the determined flow rate to a set point, and
   if the determined flow rate does not equal the set point, generate an error gain based on the pressure measured at the pressure sensor.

7. The flow control device of claim 1, wherein the calibration curve of flow rates is stored in a memory of the controller or a computer readable medium accessible by the controller.

8. A flow control device comprising:
   an inlet for receiving a flow into the flow control device;
   an outlet in fluid communication with the inlet for directing the flow out of the flow control device to a flow system which, when in fluid communication with the flow control device, causes a pressure loss associated with the flow;
   a valve located between the inlet and the outlet and responsive to valve control signals for regulating the flow to the flow control device;
   a pressure sensor to measure a pressure of a fluid in the flow control device; and
   a controller coupled to the pressure sensor, the controller configured to:
      determine a flow rate corresponding primarily to a pressure measured at the pressure sensor by comparing the pressure measured at the pressure sensor to a calibration curve of flow rates, the calibration curve correlating a sensed pressure at the pressure sensor and a corresponding flow rate in the flow system in which the flow device is installed, taking into consideration the pressure loss caused by the flow system, and
      generate a valve control signal responsive to the pressure measured at the pressure sensor to regulate the flow.

9. The flow control device of claim 8, wherein the pressure sensor is located upstream of the valve.

10. The flow control device of claim 8, wherein the pressure sensor is located downstream of the valve.

11. The flow control device of claim 8, wherein the controller is further operable to:
   receive pressure measurements from the pressure sensor;
   monitor the pressure measurements for a fluctuation;
   compare the fluctuation to a predetermined limit; and
   if the fluctuation is greater than the predetermined limit, generate an alarm.

12. The flow control device of claim 8, wherein the controller is further operable to:
   monitor the valve for a change in valve position; and if the change in valve position is greater than a predetermined amount, generate an alarm.

13. The flow control device of claim 8, wherein the controller is further configured to:
compare the determined flow rate to a set point, and
if the determined flow rate does not equal the set point, generate an error gain based on the pressure measured at the pressure sensor.

14. The flow control device of claim 8, wherein the calibration curve of flow rates is stored in a memory of the controller or a computer readable medium accessible by the controller.

15. A computer program product comprising at least one non-transitory computer readable medium storing instructions translatable by a controller of a flow control device, wherein the flow control device further comprises:
an inlet for receiving a flow into the flow control device;
an outlet in fluid communication with the inlet for directing the flow out of the flow control device to components of a flow system;
a valve located in the housing and between the inlet and the outlet and responsive to valve control signals for regulating the flow through the flow control device; and
a pressure sensor to measure a pressure of a fluid entering the flow control device at the inlet, passing the valve, and exiting the flow control device at the outlet along a single flow path;
wherein the instructions are translatable by the controller to:
determine a flow rate corresponding primarily to a pressure measured at the pressure sensor by comparing the pressure measured at the pressure sensor to a calibration curve of flow rates, the calibration curve correlating a sensed pressure at the pressure sensor and a corresponding flow rate in the flow system in which the flow device is installed, and
generate a valve control signal responsive to the pressure measured at the pressure sensor to regulate the flow.

16. The computer program product of claim 15, wherein the instructions are further translatable by the controller to:
receive pressure measurements from the pressure sensor;
monitor the pressure measurements for a fluctuation;
compare the fluctuation to a predetermined limit; and
if the fluctuation is greater than the predetermined limit, generate an alarm.

17. The computer program product of claim 15, wherein the instructions are further translatable by the controller to:
monitor the valve for a change in valve position; and
if the change in valve position is greater than a predetermined amount, generate an alarm.

18. The computer program product of claim 15, wherein the instructions are further translatable by the controller to:
compare the determined flow rate to a set point, and
if the determined flow rate does not equal the set point, generate an error gain based on the pressure measured at the pressure sensor.

19. The computer program product of claim 15, wherein the at least one non-transitory computer readable medium comprises a memory and wherein the calibration curve of flow rates is stored in the memory.

20. The computer program product of claim 19, wherein the memory is accessible by the controller.

* * * * *